Patented Apr. 6, 1943

2,315,986

UNITED STATES PATENT OFFICE 2,315,986

METHOD OF SEPARATING CINEOLES FROM HYDROCARBONS

Paul H. Scrutchfield, Wilmington, Del., assignor to Hercules Powder Company, Wilmington, Del., a corporation of Delaware No Drawing. Application March 29, 1941, Serial No. 385,850

8 Claims. (Cl. 260—333)

This invention relates to an improved method for refining essential oils and more particularly to such a method for the separation of cineoles from terpenes.

The isolation and purification of cineole from oil of eucalyptus, and from mixtures of cineole and hydrocarbons resulting from certain manufacturing operations, has been accomplished in various ways. Thus, according to one method the cineole may be separated from the terpenes by oxidation of the terpenes to water-soluble compounds with permanganate. By another method the cineole may be isolated through the formation of additive compounds with phosphoric or arsenic acid, ortho-cresol, resorcinol, or $\alpha$-naphthol. These methods are all expensive since expensive reagents and low temperatures are essential.

This invention has as an object the provision of a method for the separation of cineoles from terpenes, whereby both the cineoles and the terpenes can be recovered in substantially pure state and unchanged.

It is a further object of this invention to provide a method for the separation of cineole from terpene by selective solvent action.

A still further object is the provision of a process for separating cineoles from a cineole-terpene mixture in which the cineole and terpenes are separated into different phases by selective solvent action, thus rendering their separation economically feasible.

It is a still further object of the invention to provide a method for converting solutions of cineoles in terpenes, from which they are normally removable only with great difficulty, to solutions of cineole in materials from which they are very readily removable.

Other and further objects will appear hereinafter.

The above objects are accomplished by treating the cineole-terpene mixture with two liquids which are substantially immiscible one with the other, one being a solvent for the cineole, and the other being a solvent for the terpenes.

In carrying out the treatment in accordance with my invention, the eucalyptus oil or terpene fraction which contains cineole to be refined, is dissolved in a liquid solvent therefor, and the selective solvent for the cineole is added to the solution and brought into intimate contact therewith by agitation of the mixture. After effecting intimate contact between the liquids, they are permitted to separate into layers or phases by gravity. As a result of the separation of the two liquids, one will contain essentially the cineole in solution and the other will contain essentially the terpenes in solution. The cineole is then recovered by evaporating off the solvent by steam distillation, removing by chemical treatment and/or by suitable washes.

The process of my invention is applicable to the separation of both 1,8 and 1,4-cineole, or mixtures thereof, from terpenes, including both aliphatic and alicyclic hydrocarbons, and from terpene mixtures. Examples of terpene-cineole mixtures are such as are obtained in the manufacture of cineole by dehydrating terpin hydrate or by isomerizing terpineol as well as those obtained as by-products of the manufacture of terpene hydrates from turpentine. My invention is also applicable to the separation of cineole (eucalyptol) from oil of eucalyptus. The cineole-terpene mixtures to be treated may vary in composition from comparatively small percentages of cineole up to comparatively large percentages of cineole.

The solvent in which I dissolve the cineole-terpene mixture before contacting it with a selective solvent, must be one which is substantially immiscible or capable of being rendered immiscible, and non-reactive with the selective solvent used. Thus I may use a petroleum hydrocarbon solvent, such as, for example, petroleum ether, gasoline, kerosene, or a normally gaseous petroleum hydrocarbon held in liquid phase by elevated pressure, low temperature, or both. The concentration of the cineole-terpene mixture in such a solution may be within the range of about 5% to 80% by weight and desirably within the range of about 15% to about 30% by weight.

The selective solvent which I may use in accordance with this invention must be one which is a solvent for the cineoles, which is substantially unreactive with respect thereto under the conditions of this invention and which is capable of immiscibility at some working temperature with the terpene-solvent mixture. Although I have specified that the selective solvent shall be immiscible with the terpene-solvent mixture I desire to include materials or mixtures of materials which though miscible in some proportion with the terpene-solvent mixture, are readily rendered immiscible by the presence of a small amount of moisture. The selective solvents which I have found to be particularly efficient and desirable for the purposes of the present invention are solutions of certain phenols such as solutions of phenol in water such as an 85% solution in water, solutions of phenol in methanol or methanol and water, solutions of resorcinol in water such as 85-95% solutions in water, solutions of resorcinol in methanol, solutions of pyrogallol in water and/or methanol, and solutions of hydroquinone in water and/or methanol. In cases where solutions of the above-mentioned materials in methanol are used, it is necessary and desirable that at least a trace of moisture be present, as otherwise, the methanol would be compatible with the terpene-solvent, particularly petroleum ether. The amounts or proportions of selective solvent solutions used will of course vary with the particular solvent, the strength of solvent solution, the concentration of cineole in the cineole-terpene fraction, the degree of separation and purification desired, etc. Usually, a quantity of liquid solvent between about one and about ten times the weight of the cineole-terpene mixture is employed. This range is not, however, critical but is given merely as an example of what may be used.

The treating and separating steps in accordance with this invention may be carried out at any temperature within the range of about −60° C. to about 100° C. but preferably within the range of about 0° C. to about 40° C. In any case, the temperature used for the separating step will be such that the selective solvent is a liquid under the pressure used and such that two phases will occur. It will be appreciated that the cineole-terpene solvent mixture being treated and the treating liquid, i. e., selective solvent, may be miscible at certain temperatures but immiscible at other temperatures. Thus the treatment may be started at a temperature at which no separation into two phases can occur and the mixture then adjusted, as by cooling, to a temperature at which the required formation into two phases takes place.

The treatment of the cineole-terpene solvent mixture with the selective liquid solvent is preferably repeated a number of times. Maximum efficiency of treatment with a given quantity of selective liquid solvent is, in fact, attained when the liquid solvent is divided into a plurality of portions and a plurality of extractive treatments is given to the cineole-terpene solvent mixture. Increased efficiency is likewise attained when both the selective liquid solvent and the cineole-terpene solvent mixture are divided into a plurality of portions and a plurality of extractive treatments is given to each of the cineole-terpene-solvent portions. For example, a cineole-terpene mixture is diluted with a solvent such as petroleum ether and divided into three portions A, B, and C. Portion A may then be extracted with four portions of an 85% phenol solution and the phenol-cineole mixture, separated after each extraction, in turn used to treat portion B. Portion B may be subjected to an additional extraction with a fresh portion of phenol. Portion C may likewise be treated with the cineole-phenol extracts obtained after each of the extractions of portion B. Portion C may have one or more additional extractions with fresh phenol. The extracts from portion C may then be suitably treated to recover the cineole.

It will be appreciated that the method in accordance with this invention is adapted to continuous operation wherein the cineole-terpene mixture is continuously mixed with suitable solvents and the mixture is fed to a separator such as a continuous decantor or centrifuge for separation of the resulting phases. The process may also be carried out in a countercurrent manner in accordance with which the cineole-terpene solvent mixture is subjected to increasingly purer portions of selective liquid solvent while the mixture is itself becoming progressively leaner in the cineole. This countercurrent method of operation may be carried out continuously by means of a packed or unpacked column in which the two phases move in opposite directions by virtue of a difference in specific gravity.

The method of recovery of the cineole from the cineole selective solvent extract depends to some extent upon the nature of the solvent used. For example, where aqueous phenol is used as the selective solvent and petroleum ether as the terpene solvent the extract may be freed of petroleum ether and then phenol by washing and distilling. Alternatively, the petroleum ether may be distilled off, water added to the residue and the mixture steam distilled. Since the phenol is very soluble in hot water, the cineole distills nearly free of phenol. The cineole may then be washed with 10% NaOH, water washed and dried over $CaCl_2$. Where a solution of hydroquinone in methanol is used the extract containing the cineole may be diluted with water and the oil, which separates, washed free of hydroquinone with water. Petroleum ether may be driven off by heating. Any combination of treatments utilizing distillation, washes, extraction, etc., may be used to separate the cineole from the extracts.

The following examples are given to illustrate the invention but are not to be considered as limiting the scope thereof.

*Example 1*

A solution composed of 7500 grams of a cineole-terpene mixture containing 55% cineole, and 22,500 grams of petroleum ether was prepared and separated into three equal portions A, B, and C. Portion A was then extracted five times using 1875 gram portions of 85% phenol for each extraction. Portion B was then extracted five times in the following manner; the first extraction was made with the combined first and second extracts from A; the second, third and fourth extractions were made with the third, fourth and fifth extracts from A respectively; the fifth extraction was made with 1875 grams of 85% phenol. Portion C was then extracted 6 times in the following manner; the first extraction was made with the combined first and second extracts from B; the second, third and fourth extractions were made from the third, fourth and fifth extracts respectively from B; the fifth and sixth extracts were each made with 1875 gram portions of 85% phenol. The total phenol used was 15,000 grams.

The cineole content in the residues of portions A, B, and C was as follows: Portion A, after the fifth extraction thereof; 31.2% cineole; portion B after the fifth extraction thereof 44.5% cineole; and portion C after the sixth extraction thereof 47.9% cineole.

The extracts from portion C were as follows:

| | Number | | | | | |
|---|---|---|---|---|---|---|
| | First | Second | Third | Fourth | Fifth | Sixth |
| Extract | Grams 515.5 | Grams 202 | Grams 209 | Grams 5474.6 | Grams 6327 | Grams 4067 |

The first, second and third extracts were completely soluble in 10% NaOH thus indicating that these extracts were composed primarily of a phenol solution with substantially no cineole.

The fourth extract was isolated by distilling the petroleum ether, then adding about 1 liter of water to the residue and steam distilling. Since the phenol is very soluble in hot water, the cineole distilled nearly free of phenol. The cineole was then washed with 10% NaOH, water washed and dried over CaCl₂. A yield of 853 grams of oil containing 73.6% cineole was obtained.

The fifth extract was freed of petroleum ether and then phenol by washing with an excess of alkali, water washing, drying over CaCl₂ and distilling. A yield of 746 grams of oil containing 78.7% cineole was obtained.

The sixth extract was purified in the same manner as the fourth extract and yielded 404 grams of an oil containing 74.4% cineole. The distillates from the fourth and sixth extracts were then combined and distilled yielding 907 grams of oil.

The still foots from the fourth, fifth and sixth extracts were combined and distilled yielding 338 grams of oil containing 82.1% cineole.

The fourth, fifth and sixth extracts and their foots were then combined, yielding 1991 grams of a mixture containing 79.6% cineole. This material had the following properties:

Specific gravity 15.6/15.6=0.9040
$N^{20}$=1.4593

A substantial yield of cineole of greatly increased purity was obtained as a result of the above procedure.

*Example 2*

About 200 g. of a terpene fraction containing 55% cineole was diluted with 600 g. of petroleum ether. About 100 g. of hydroquinone was dissolved in 260 g. of methanol. The terpene-petroleum ether solution was extracted with about 1/10 of the hydroquinone-methanol solution, whereupon the hydroquinone separated in the form of crystals. On the addition of 15 cc. of water, the crystals dissolved and the water-methanol-hydroquinone mixture separated from the terpene-petroleum ether solution. After separation of the extract, the terpene solution was extracted with the remainder (divided into three portions) of the hydroquinone solution. The extracts containing the cineole were diluted with water and the oil which separated was washed free of hydroquinone with water. The extracts were freed of petroleum ether by heating. A yield of 71 grams of an oil containing 76.1% cineole was obtained. This oil had the following properties:

$N^{20}_D$ 1.4564
Sp. gr. 15.5/15.5=0.9008

*Example 3*

About 200 g. of a terpene fraction containing 55% cineole was diluted with 600 g. of petroleum ether. This solution was extracted with five portions of a solution containing 100 g. of resorcinol dissolved in 100 g. of methanol. The extracts were steam distilled. The oil in the distillate was separated by dilution with water and heated to 110° C. to remove any petroleum ether. A yield of 44.7 grams of an oil containing 87.5% cineole was obtained.

*Example 4*

About 100 g. of a terpene fraction containing 55% cineole was diluted with 300 g. petroleum ether. About 50 g. of pyrogallol was dissolved in 100 g. of methanol. The pyrogallol-methanol solution was divided into four parts with which the terpene-petroleum ether solution was extracted. The cineole containing oils were liberated from the pyrogallol solution by dilution with H₂O. The oils were washed free of pyrogallol with water and then heated to 110° C. to remove petroleum ether. A yield of 38.6 grams of an oil containing 87.8% cineoles was obtained.

The method in accordance with the present invention has the advantage that it permits the isolation and purification of cineoles in a more efficient and economical manner than has hitherto been possible. This permits of the production of a cineole which is commercially useful in many operations.

It will be understood that the details and examples hereinbefore set forth are illustrative only and that the invention as broadly described and claimed is in no way limited thereby.

What I claim and desire to protect by Letters Patent is:

1. The method of separating cineole from a cineole-terpene mixture, which comprises dissolving the mixture in a petroleum hydrocarbon solvent therefor, treating the solution so formed with a predetermined amount of a selective liquid solvent for the cineole selected from the group consisting of phenol, resorcinol, hydroquinone and pyrogallol, separating the separated selective solvent from the mixture and recovering the cineole from the selective solvent.

2. The method of separating cineole from a cineole-terpene mixture, which comprises dissolving the mixture in a solvent therefor, contacting the solution so formed with a predetermined amount of about an 85% solution of phenol, separating the separated phenol from the mixture solvent and recovering the cineole from the phenol.

3. The method of separating cineole from a cineole-terpene mixture, which comprises dissolving the mixture in a solvent therefor, contacting the solution so formed with a predetermined amount of a methanol solution of resorcinol, separating the separated resorcinol from the mixture solvent, and recovering the cineole from the resorcinol.

4. The method of separating cineole from a cineole-terpene mixture, which comprises dissolving the mixture in a solvent therefor, contacting the solution so formed with a predetermined amount of a methanol solution of pyrogallol, separating the pyrogallol separated from the mixture solvent, and recovering the cineole from the pyrogallol.

5. The method of separating cineole from a cineole-terpene mixture, which comprises dissolving the mixture in a petroleum ether, contacting the solution so formed with a predetermined amount of a selective liquid solvent for the cineole whereby the mixture separates into a terpene solvent phase and a cineole solvent phase, separating the phases and recovering the cineole from the selective solvent.

6. The method of separating cineole from a cineole-terpene mixture, which comprises dissolving the mixture in petroleum ether treating the solution so formed with a predetermined amount of a liquid solvent for the cineole selected from the group consisting of phenol, resorcinol, hydroquinone and pyrogallol, separating the separated selective solvent from the mixture and recovering the cineole from the solvent.

7. A method for the recovery of cineole from a cineole-terpene solution which comprises diluting the solution with a petroleum hydrocarbon, subjecting the diluted solution to the action of a predetermined amount of a selective solvent comprising a phenolic substance selected from the group consisting of phenol, resorcinol, hydroquinone, and pyrogallol, agitating the mixture to permit intimate contact between the ingredients thereof, permitting the mixture to separate into two phases comprising a terpene-petroleum hydrocarbon phase and a cineole selective solvent phase, withdrawing the cineole selective solvent phase, and treating it with water and then heating to recover the cineole.

8. The method of separating cineole from a cineole-terpene mixture, which comprises dissolving the mixture in a solvent therefor, contacting the solution so formed with a selective liquid solvent for the cineole which is substantially unreactive with the cineole under the conditions of treatment and which is capable of immiscibility with the terpene-solvent mixture, separating the selective solvent therefrom and recovering the cineole from the selective solvent.

PAUL H. SCRUTCHFIELD.

CERTIFICATE OF CORRECTION.

Patent No. 2,315,986.  April 6, 1943.

PAUL H. SCRUTCHFIELD.

It is hereby certified that error appears in the printed specification of the above numbered patent requiring correction as follows: Page 3, second column, line 54, claim 4, for "pyrogallol separated" read --separated pyrogallol--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.